United States Patent
Mäenpääet al.

(10) Patent No.: US 6,590,880 B1
(45) Date of Patent: Jul. 8, 2003

(54) APPARATUS, AND ASSOCIATED METHOD, FOR FACILITATING COMMUNICATION HANDOVER IN PACKET RADIO COMMUNICATION SYSTEM

(75) Inventors: Henri Mäenpää, Tampere (FI); Janne Kallio, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/419,440

(22) Filed: Oct. 15, 1999

(51) Int. Cl.[7] .............................................. H04Q 7/20
(52) U.S. Cl. ...................... 370/331; 370/338; 455/436; 455/437
(58) Field of Search ................. 370/401, 405, 370/442, 352, 351, 503, 331, 332, 335, 338, 356, 395.52, 395.54, 395.06, 395.61; 455/432, 436, 437

(56) References Cited

U.S. PATENT DOCUMENTS

| | | | | |
|---|---|---|---|---|
| 5,345,448 A | * | 9/1994 | Keskitalo ...................... 370/331 |
| 5,530,693 A | * | 6/1996 | Averbuch et al. ............ 370/331 |
| 5,541,979 A | * | 7/1996 | Leslie et al. ................. 370/337 |
| 5,636,217 A | * | 6/1997 | Moelard ...................... 370/338 |
| 6,160,804 A | * | 12/2000 | Ahmed et al. ............... 370/349 |
| 6,353,607 B1 | * | 3/2002 | Valentine et al. ............ 370/349 |
| 6,363,065 B1 | * | 3/2002 | Thornton et al. ............ 370/352 |
| 6,424,638 B1 | * | 7/2002 | Ray et al. .................... 370/331 |
| 6,434,134 B1 | * | 8/2002 | La Porta et al. ............. 370/338 |

FOREIGN PATENT DOCUMENTS

WO    WO 98/47302    10/1998    ....................... 7/38

OTHER PUBLICATIONS

Banh B A J et al: Handover Re-Routing Schemes for connection oriented services in mobile ATM Francisco, CA Mar. 29-Apr. 2, 1998, New York, Ny: IEEE, US, Mar. 29, 1998 (1998-03 1139-1146.

* cited by examiner

Primary Examiner—Nay Maung
Assistant Examiner—Jeaan Gelin

(57) ABSTRACT

Apparatus, and an associated method, for facilitating handover of communications between a source radio gateway and a target radio gateway of a packet radio communication system. Subsequent to handover of communications from the source to the target radio gateways, a default frame is generated at the target gateway. The default frame is forwarded to a communication station operable pursuant to a communication session with a mobile station, the communication session of which has been handed over from the source to the target radio gateway. The default frame identifies, to the communication station, the identity of the target gateway. Thereby, the communication station is informed that the target gateway is the address to which additional data generated at the communication station is to be routed.

20 Claims, 3 Drawing Sheets

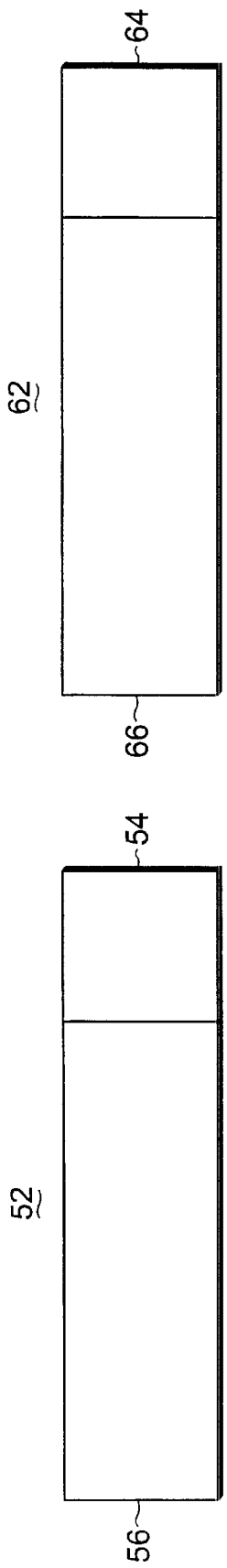
FIG. 2
FIG. 3
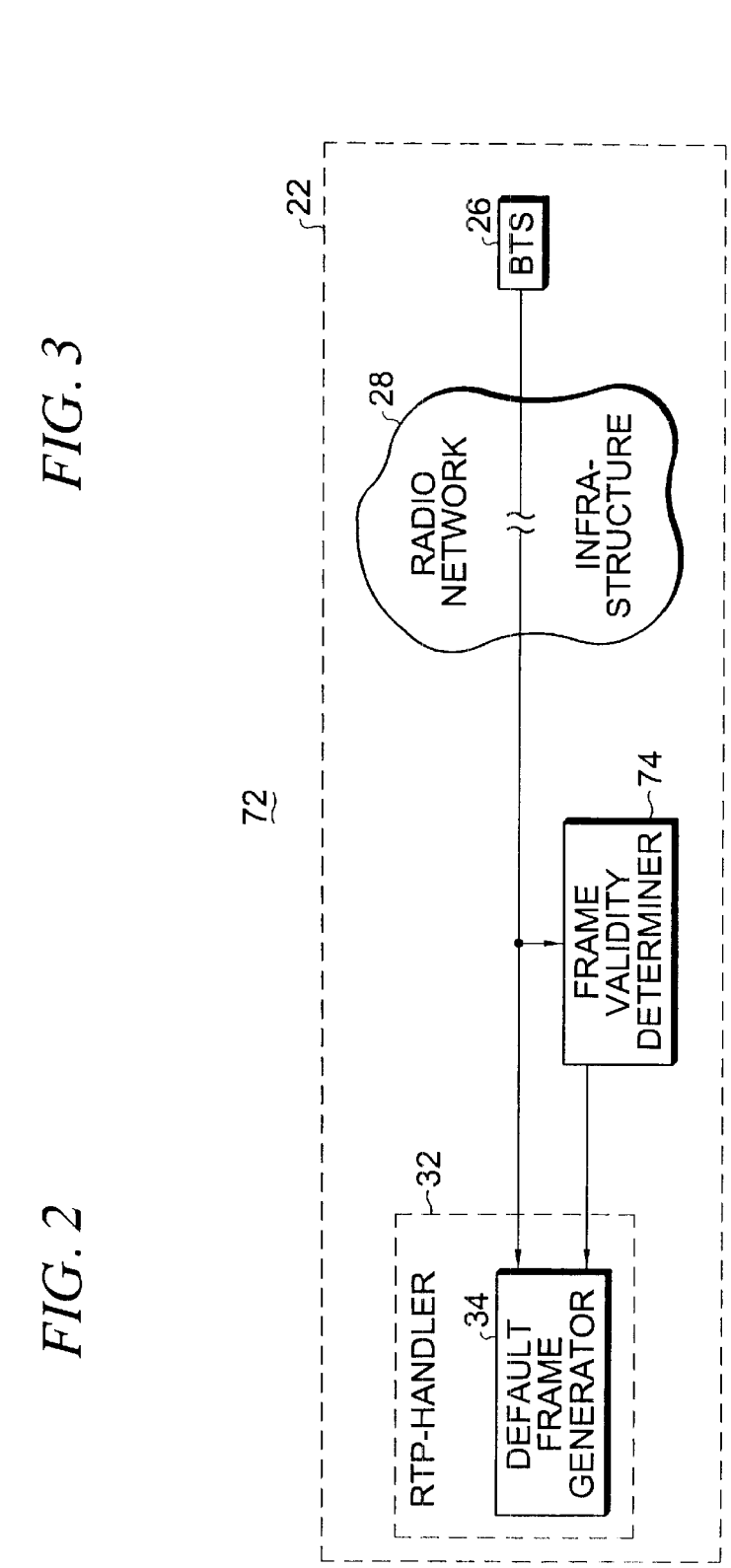
FIG. 4

APPARATUS, AND ASSOCIATED METHOD, FOR FACILITATING COMMUNICATION HANDOVER IN PACKET RADIO COMMUNICATION SYSTEM

The present invention relates generally to the communication of real time media, such as media data formatted pursuant to RTP (real-time transmission protocol), in a radio communication system. More particularly, the present invention relates to apparatus, and an associated method, by which to facilitate handover of communications from a source radio gateway to a target radio gateway when real-time media data is communicated by discontinuous transmission and when real-time media is communicated pursuant to a multiple call connection. Operation of an embodiment of the present invention reduces the possibility that media frames might be erroneously sent to a source, rather than a target, gateway.

BACKGROUND OF THE INVENTION

Advancements in communication technologies have permitted the introduction of, and popularization of, new types of, and improvements in existing, communication systems. Increasingly large amounts of data are permitted to be communicated at increasing throughput rates through the use of such new, or improved, communication systems. As a result of such improvements, new types of communications, requiring high data throughput rates, are possible. Digital communication techniques, for instance, are increasingly utilized in communication systems to efficiently communicate digital data, and the use of such techniques has facilitated the increase data throughput rates.

When digital communication techniques are used, information which is to be communicated is digitized. In one technique, the digitized information is formatted into packets, or frames, and, once formatted, the data is communicated upon a communication channel, thereby to be transmitted to a destination. Individual ones, or groups, of the packets or frames of data can be communicated at discrete intervals, and once communicated, concatenated together to recreate the informational content contained therein.

Because data formatted in this manner can be communicated at the discrete intervals, a communication channel need not be dedicated solely for the communication of data generated by one sending station to one receiving station, as conventionally required in circuit-switched communications. Instead, a single channel can be shared amongst a plurality of different sending and receiving station-pairs. Because a single channel can be utilized to effectuate communications by the plurality of pairs of communication stations, improved communication capacity is possible.

Also through the use of digital communication techniques, any of a large number of different types of data can be communicated. And, more than one type of data can be communicated in a multi-media application. Different types of data exhibit different communication requirements however. For instance, voice data must be communicated in real time. That is to say, voice data must be communicated without significant delay and must be communicated in a manner which permits its reconstruction at a receiving station in a manner which introduces minimal time distortion. Otherwise, the voice data shall appear to be noticeably distorted.

Internet telephony is exemplary of communications which can be effectuated utilizing digital communication techniques. With the popularization of the Internet and communication thereon, standardized protocols have been set forth by which to communicate information in a form amenable to its transmission by way of the Internet. An example protocol is H.323. H.323 is a widely used ITU standard which uses RTP (real-time transmission protocol).

According to the H.323 protocol, when data is to be transmitted by a sending station, logical channels upon which to transmit the data are assigned. The data channels are allocated responsive to requests made by the sending station. Separate logical channels are requested for separate types of data. For instance, a first logical channel is requested upon which to transmit voice data, and allocation of a second logical channel is requested for transmission of non-voice data. A subset of the H.323 protocol, referred to as the H.245 protocol, defines the manner in which the channels are requested. Data is thereafter transmitted upon the logical channels. In conventional manner, individual packets, or frames, include header information, such as IP, UDP, and RTP information, to identify to where the packet is to be directed and to provide a time stamp with the packet. The informational content, referred to as the payload, is appended to the header information.

The H.323 protocol was intended originally for wireline communications, such as between communication stations, connected by wireline connections including those of the Internet. But, advancements in communication technologies have also permitted the widespread usage of radio communication systems. A cellular communication system is exemplary of a wireless communication system which has achieved wide levels of popularity and usage. Telephonic communication by way of a cellular communication system mimics communication by way of a conventional, wireline, telephonic system. However, difficulties arise when packet or frame-formatted data, such as that formatted pursuant to the H.323, or other RTP, protocol is communicated by way of a cellular communication system.

In general, a handover of communications occurs from a source gateway to a target gateway when a mobile station is repositioned out of proximity with a source gateway and into proximity with a target gateway.

When a determination is made that a handover should be effectuated, a selection is made of the target gateway and thereafter, the handover is performed. Conventional handovers assume an active communication session between a mobile station and another communication station. But in H.323-based communications, the communication session might not be active at the moment of handover.

For instance, due to the discontinuous nature of packetized communications, such as pursuant to DTX transmissions, a handover of communications of a mobile station operable in the cellular communication system during a communication session might not be immediately reported to the other communication station of the communication session. In such an occurrence, the other communication station might not properly route downlink data to permit its efficient transmission to the mobile station. A similar misrouting of data might also occur if the mobile station is operable pursuant to multiple-call connection. An example multiple-call connection is a situation in which one call, or communication session, is in an active mode and one, or more, other call, or communication sessions, is in an inactive mode, such as a call placed on hold, mode.

That is to say, a communication session is susceptible to misrouting of data when DTX transmission is utilized and data frames are not being communicated by a mobile station at the moment of handover from a source to a target gateway.

A manner by which to inform a communication station of a handover of communications would facilitate improved communications by reducing problems conventionally associated with misrouting of data frames subsequent to a communication handover.

It is in light of this background information related to radio communications that the significant improvements of the present invention have evolved.

SUMMARY OF THE INVENTION

The present invention, accordingly, advantageously provides, apparatus, and associated method, for facilitating communication handovers between radio gateways in a packet radio communication system.

In operation of an embodiment of the present invention, a default frame is generated at the target gateway responsive to indications received thereat of the handover of communications thereto. The default frame is transmitted to a communication station with which a mobile station is paired pursuant to a communication session. The default frame identifies, to the communication station, the identity of the target gateway. Thereby, the communication station is informed that the target gateway is the address through which additional data generated at the communication station is to be routed. And, as a result of such identification, the possibility that media frames might erroneously be sent to a source gateway instead of the target gateway is reduced.

In one implementation, an embodiment of the present invention is operable at a radio gateway positioned between the packet data network and a radio network. When a handover of communications is effectuated to the radio gateway, here referred to as the target gateway, from another gateway, referred to here as a source gateway, indications of the handover are provided to a RTP handler. The indications of the handover are, for instance, uplink data frames generated by the mobile station. The uplink data frames, might for instance, be formed of a normal speech frame, an SID (silent descriptor) frame, or an idle frame. The RTP handler includes a default frame generator which is also provided with the indications of the effectuation of the handover of communications. Responsive to detection of the indications of the handover, the default frame generator generates a frame for transmission to the communication station which forms the other part to the communication session. The default frame identifies the target gateway at the gateway through which data frames originated at the communication station should be routed. Thereby, the communication station is notified of the identity of the target gateway. Transmission of subsequent frames of data to an erroneous, i.e., the source, gateway can thereby be prevented.

In one implementation, the frames of data are formatted pursuant to the H.323, or other RTP, protocol. And the data frames are communicated to effectuate Internet telephony between a mobile station and a communication station. As the mobile station travels through a geographical area encompassed by one radio gateway into an area encompassed by another radio gateway, a communication handover is effectuated to permit continued communications between the mobile station and a communication station. The radio gateway from which communications are handed over are referred to as the source gateway, and the gateway to which communications are handed over is referred to as the target gateway. As soon as the target gateway receives indications that a communication handover is to be effectuated thereto, a default frame generator located at the target radio gateway generates a default frame which is transmitted to the communication station involved in the communication session. The default frame identifies the target radio gateway with its identity, thereby to inform the communication station that subsequent data frames to be communicated to the mobile station should be routed through the target radio gateway.

An embodiment of the present invention is also operable in an Internet telephony scheme in which the mobile station is capable of multiple call operation. For instance, a mobile station operable pursuant to a multi-call scenario is capable of maintaining two, or more, communication sessions concurrently. For instance, one communication session might be in an active state in which communication frames are exchanged between the mobile station and another communication session might be in an inactive state, such as a call placed in an "on-hold" condition. When a communication handover is effectuated from a source gateway to a target gateway while the mobile station is in such concurrent communication sessions, the first communication station operable in the active communication session is notified immediately of the communication handover. But, the communication station operable in the inactive communication session is not conventionally immediately notified of the communication handover. In operation of an embodiment of the present invention, a default frame generator is operable to generate a default frame for transmission to the communication station to inform the communication station of the communication handover. Thereby, the communication station operable in the inactive communication session is also immediately notified of the handover.

In a further implementation, the target radio gateway is further operable to detect whether uplink data frames received thereat, presumptively from a mobile station, contained valid data. If a determination is made that the data is invalid, a default frame generator is again utilized to generate a default frame. The default frame is transmitted to the destination. Thereby, invalid data is not forwarded to the communication station.

In these and other aspects, therefore, apparatus, and an associated method, for a target gateway forming a portion of a radio communication system. The radio communication system is operable to permit communication of packet-formatted data between a first communication station and a second communication station. The first communication station forms a mobile station, and the communication network includes a source gateway through which communications are initially effectuated, and the target gateway through which communications are subsequently selected to be effectuated. The apparatus informs the second communication station of selection of the target gateway for effectuation of subsequent communications therethrough. A default generator is coupled to receive indications of selection of the target gateway through which to effectuate the subsequent communications. The default frame generator generates a default frame for transmission to the second communication station. The default frame identifies the target gateway, thereby to inform the second communication station of the selection of the target gateway for the effectuation therethrough of the subsequent communications.

In these and other aspects, apparatus, and an associated method, is further provided for a radio communication system operable to permit concurrent communication of packet-formatted data between a mobile station and a second communication station and between the mobile station and a third communication station. The packet-formatted data is communicated by way of a communication network having a radio part and a wireline part. The communication network includes a source gateway through which communications are initially effectuated and a target gateway through which communications are subsequently selected to be effectuated. At least one of the concurrent communication sessions is in an inactive state when the effectuation of the subsequent communication through the target gateway occurs. A timer is located at the at least one of the second and at least third communication stations in the inactive state when the effectuation of the subsequent communication occurs. The timer times periods of absence of incoming data during a communication session with the mobile station and generates a request to alter communication session parameters if a timed period of the absence of incoming data exceeds a selected time.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 illustrates a representation of an SID (silent descriptor) frame generated during operation of an embodiment of the present invention.

FIG. 3 illustrates a representation of an idle frame generated during operation of another embodiment of the present invention.

FIG. 4 illustrates a functional block diagram of a radio gateway similar to the source and target radio gateways forming a portion of the communication system shown in FIG. 1, but here of a further embodiment of the present invention.

DETAILED DESCRIPTION OF THE PREFERRED EMBODIMENT

Figure 1:
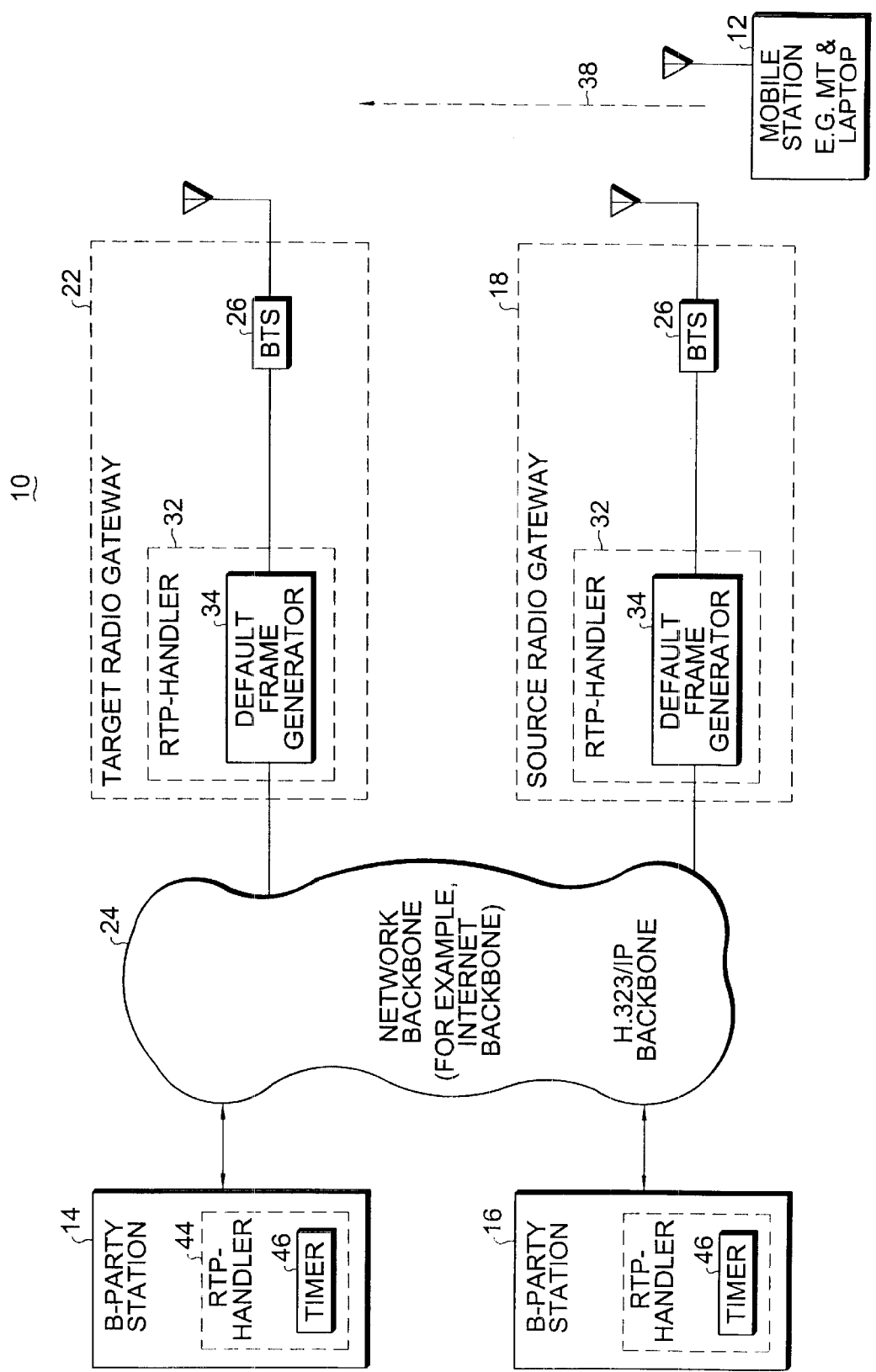
FIG. 1 illustrates a functional block diagram of a packet radio communication system in which an embodiment of the present invention is operable.

Referring first to FIG. 1, a communication system, shown generally at 10, provides for the communication of frame-formatted data between mobile stations, which the mobile station 12 is exemplary, and another communication station, such as the B-party stations 14 and 16 shown in the Figure. In the exemplary implementation, the communication system is a multi-user communication system in which a plurality of mobile stations are operable to carry on a plurality of communication sessions with a plurality of other communication stations. And, in the exemplary implementation, the communication system includes a radio part and a wireline part, each capable of communicating frame-formatted data. In the exemplary implementation, the radio part of the radio communication system is formed of a GSM (global system for mobile communications) communication system, and the wireline portion is formed of an Internet network. In other implementations, the communication system can be otherwise formed and embodiments of the present invention are analogously operable therein.

The mobile station is capable of generating frame-formatted data, here RTP (real-time transmission protocol) data formatted pursuant to an H.323 protocol. The mobile station is formed, for example, of a mobile station operable in the aforementioned GSM system, together with a laptop computer or the like, which generates the H.323-formatted data. Internet telephony is exemplary of an application in which the mobile station is utilized to communicate with at least a selected one of the B-party stations 12 and 16.

The communication system also includes a plurality of radio gateways of which the source radio gateway 18 and target radio gateway 22 are representative. The gateways form a gateway to the network backbone 24 of the wireline portion of the communication system. Here, the network backbone is an Internet backbone in which RTP/IP, e.g., H.323-formatted, data can be communicated. As illustrated, the B-party stations 14 and 16 are coupled to the network backbone, e.g., by way of a PSTN (not shown).

The source radio gateway is here defined to include at least a base transceiver station (BTS) 26, and an RTP handler 32. The RTP handler terminates, one side, at the IP packet network backbone 24 and, at the other side to a circuit-switched mobile network, which includes a BTS and mobile station. And, the RTP handler 32 includes a default frame generator 34 operable pursuant to an embodiment of the present invention.

The target radio gateway 22 analogously includes the functional elements of which the source radio gateway is formed. Commonly-referenced elements of the target radio gateway 22 therefore are shown to include a base transceiver station (BTS) 26, radio network infrastructure 28, and an RTP handler 32. The RTP handler 32 also includes a default frame generator 34 operable pursuant to an embodiment of the present invention.

During operation of the communication system, a communication session is formed between the mobile station 12 and a B-party station, e.g., B-station 14. When the communication session is in the active state and the mobile station is positioned within the coverage area defined by the source radio gateway, frame-formatted data is communicated between the B-party station 14 and the mobile station by way of the source radio gateway. And, if the mobile station is capable of multiple-call operation, a second communication session is possible with another communication station, such as the B-party station 16 concurrent with the communication session with the first B-party station 14. For instance, a communication session is in the active mode in which frames of data are communicated between the communication station 14 and the mobile station, and a second communication session with the station 16 is in the inactive state, such as a call which is placed "on-hold."

Because of the mobility permitted of the mobile station, the mobile station is capable of travelling out of an area encompassed by the source radio gateway 18 and into an area encompassed by another radio gateway, such as the target radio gateway 22. When the mobile station travels in this manner, indicated by the arrow 38, a handover of communications from the source radio gateway to the target radio gateway is effectuated. Such handover is effectuated, for instance, subsequent to MAHO (mobile-assisted handover procedures). Because of the discontinuous nature of frames of data, in conventional operation, frames of data originated at the B-party station might continue to be routed to the source radio gateway even subsequent to handover of communications to the target radio gateway. Operation of an embodiment of the present invention reduces the possibility of such occurrence, thereby to reduce the possibility that frames of data originated at the B-party station shall not be delivered to the mobile station due to rerouting of the frame to the source radio gateway.

In operation, the RTP handler 32 of the target radio gateway is notified of the handover of communications to the target gateway. The default frame generator 34, responsive to receipt at the RTP handler of the indication of the handover of communications, generates a default frame of data which is transmitted to the B-party station 14 immediately thereafter. The default frame generated by the generator 34 identifies the target radio gateway to be the gateway to which subsequent frames generated by the B-party station should be routed by way of the target radio gateway rather than by way of the source radio gateway. Thereby, even in the absence of a data frame generated by the mobile station to the B-party station, a locally-generated frame, generated at the default frame generator 34 of the target radio gateway, informs the B-party station of the proper routing of subsequent frames of data. Thereby, subsequently-generated frames of data, originated at the B-party station are not misrouted to the source radio gateway.

Analogously, in a multiple-call connection, in which one of the communication sessions is in the inactive state, the B-party station involved in the inactive communication session would not conventionally be informed of the communication handover. Through operation of an embodiment of the present invention, a default frame is generated by the default frame generator of the target radio gateway to inform the B-party station of the communication handover. Subsequent frames of data originated at the B-party station involved in the inactive communication session are thereby also not misrouted to the source radio gateway.

The B-party stations 14 and 16 are each further shown to include RTP handlers 44, and the RTP handlers are each also shown to include timers 46. The timers 46 are operable in an alternate embodiment of the present invention, also in a multiple-call scenario. As noted above, if the mobile station with which a handover of communications is effectuated has established more than one concurrent communication session, all of the communication sessions are handed over at the same time. If a particular communication session is active, that is, active media exchange is going on between the end-points, the media transport destination is changed as described above. If the connection is inactive, although the timing of the media channel change becomes less critical, the RTP handler of the B-party station does not receive anything from the mobile station. If a time period, detected by timing out of the timer 46, expires at the affected B-party station without the receipt of data from the mobile station, a request is made from the affected B-party station to change the media channel parameters, obviating the need for a separate default frame to be detected at the B-party station. For instance, some RTP session parameters are changed during handover procedures. For example, the sequence numbers of the RTP packets might experience a discontinuation in the handover, RTCP reports received by the affected B-party station are based upon the point of view of the new receiver, etc.

FIG. 2 illustrates a default frame, shown generally at 52, generated by the default frame generator 34 of an embodiment of the present invention. Here, the default frame forms an SID (silence indicator) frame, here including a preamble portion 54 and a payload portion 56. In the GSM system, an SID frame is of a size and structure corresponding to a speech frame. In operation of an embodiment of the present invention, however, because the SID frame is generated at the radio gateway by the default frame generator, instead of the frame containing data representative of background noise, a ninety-five bit pattern of fixed characteristics is instead generated. The B-party station to which the SID frame is transmitted identifies the frame as an SID frame.

FIG. 3 illustrates another default frame, here shown generally at 62, generated by a default frame generator 34 of another embodiment of the present invention. Here, the frame 62 forms an idle frame, also including a preamble portion 64 and a payload portion 66. Here, as is conventional of idle frames defined in the GSM system, the payload portion 66 is formed of a sequence of logical "1" values. When generated by the default frame generator and forwarded to the B-party station, the identity of the target radio gateway through which subsequent frames generated by the B-party station should be routed is provided to the B-party station.

FIG. 4 illustrates a radio gateway, here shown generally at 72 of a further embodiment of the present invention. Analogous to the source and target radio gateways 18 and 22 shown in FIG. 1, the radio gateway 72 is again shown to include a base transceiver station 26, radio network infrastructure 28, an RTP handler 32, and a default frame generator 34. Such elements are operable as above-described.

In the further embodiment shown in the Figure, the radio gateway further includes a frame validity determiner 74 coupled to receive uplink data frames routed through the radio gateway to be directed towards a B-party station, such as station 14 shown in FIG. 1. The frame validity determiner is further coupled to the default frame generator 34. The frame validity determiner is operable to determine whether an uplink data frame directed to the B-party station, purportedly by the mobile station 12 (shown in FIG. 1) is a valid frame. If a determination is made that the frame is a valid frame, the frame is forwarded to the B-party station. If, however, the frame is determined by the determiner to not be a valid frame, the default frame generator 34 is caused to substitute a default frame for the invalid frame.

The embodiment of the radio gateway 72 shown in FIG. 4 thereby provides an additional use of the default frame generator.

Figure 5:
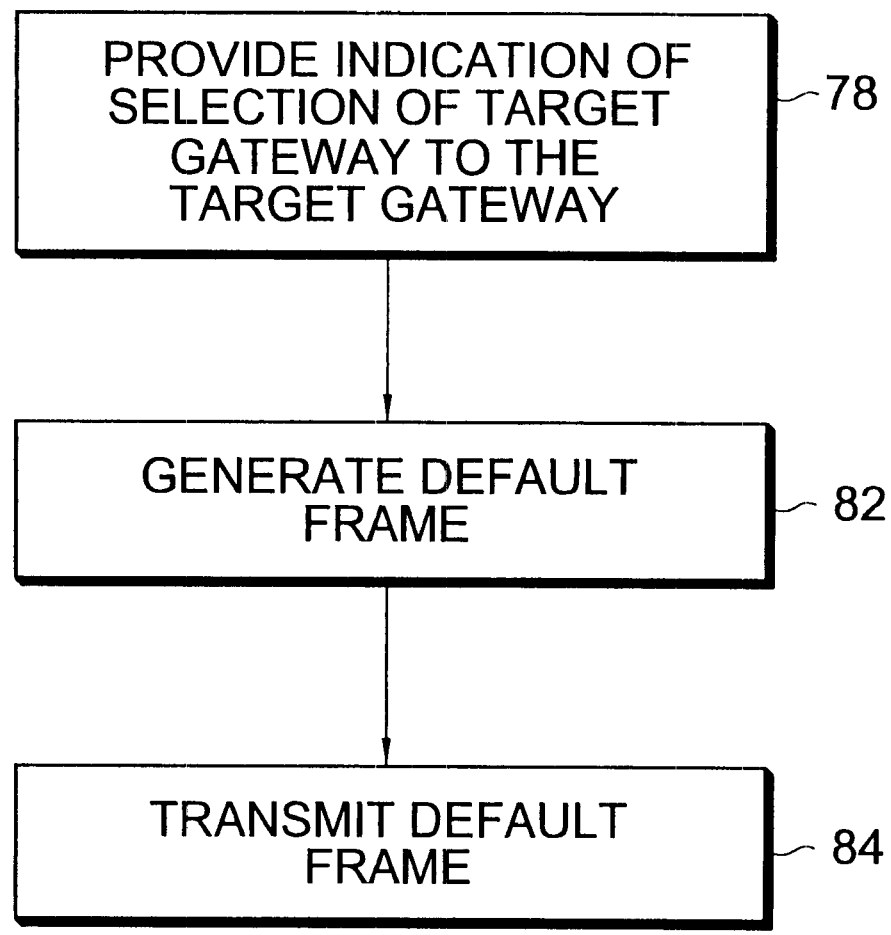
FIG. 5 illustrates a method flow diagram listing the method of operation of an embodiment of the present invention.

FIG. 5 illustrates a method, shown generally at 76, of an embodiment of the present invention. The method 76 is operable to inform a communication station, such as a B-party station shown in FIG. 1, of selection of the target radio gateway for the effectuation of communications therethrough.

First, and as indicated by the block 78, indications of selection of the target radio gateway through which to effectuate subsequent communications is provided to the target radio gateway.

Then, and as indicated by the block 82, a default frame is generated at the target gateway responsive to the indications provided to the target gateway. The default frame identifies the target gateway.

Then, and as indicated by the block 84, the default frame is transmitted to the second communication station, thereby to inform the communication station of the target gateway for the effectuation therethrough of the subsequent communications.

Thereby, through operation of an embodiment of the present invention, a manner is provided by which to facilitate handover of communications between a source and target radio gateway when real-time media data is communicated by discontinuous transmission. Through operation of an embodiment of the present invention, the possibility that media frames might be erroneously sent to a source, rather than to a target, gateway is reduced.

The previous descriptions are of preferred examples for implementing the invention, and the scope of the invention should not necessarily be limited by this description. The scope of the present invention is defined by the following claims:

We claim:

1. In a radio communication system operable to permit communication of packet-formatted data between a first communication station and a second communication station, the first communication station forming a mobile station, and the communication network including a source gateway through which communications are initially effectuated with the mobile station formed of the first communication station and a target gateway through which communications are subsequently selected to be effectuated, an improvement of apparatus for the target gateway for informing the second communication station of selection of target gateway for effectuation of subsequent communications therethrough, said apparatus comprising:

a default frame generator adapted to receive indications of selection of the target gateway through which to effectuate the subsequent communications, said default frame generator for generating a default frame for transmission to the second communication station, the default frame identifying the target gateway, thereby to inform the second communication station of the selection of the target gateway for the effectuation therethrough of the subsequent communications with the mobile station formed of the first communication station.

2. The apparatus of claim 1 wherein the packet-formatted data is communicated pursuant to discontinuous transmission and wherein the default frame generated by said default frame generator is operable during discontinuous periods of the discontinuous transmission.

3. The apparatus of claim 1 wherein the packet-formatted data comprises TCP (transport control protocol)-formatted data and wherein the default frame generated by said default frame generator comprises a TCP-formatted frame.

4. The apparatus of claim 1 wherein said default frame generator comprises a SID (silence indicator) frame generator and wherein the default frame comprises a SID (silence indicator) frame.

5. The apparatus of claim 1 wherein the default frame generated by said default frame generator comprises an idle frame.

6. The apparatus of claim 1 wherein the packet-formatted data comprises UDP-formatted data and wherein the default frame generated by said default frame generator comprises a UDP-formatted frame.

7. The apparatus of claim 1 wherein the mobile station formed of the first communication station sends uplink data to the target gateway subsequent to effectuation of the communications through the target gateway and wherein the indications of selection to which said default frame generator is coupled to receive comprise the uplink data sent by the mobile stations.

8. The apparatus of claim 6 wherein the uplink data sent by the mobile station formed of the first communication station comprises an idle frame and wherein said default frame generator generates the default frame responsible to receipt at the target gateway of the idle frame of which the uplink data is comprised.

9. The apparatus of claim 6 further comprising an uplink frame validity determiner adapted to receive the uplink data sent by the mobile station, said uplink validity determiner for determining whether the uplink data is valid data.

10. The apparatus of claim 8 wherein said default frame generator is further coupled to receive indications of determinations made by said frame validity determiner, said default frame generator further for substituting a default frame for each uplink data frame of which the uplink data is formed which is determined by said uplink validity determines not to be valid data.

11. The apparatus of claim 1 wherein the packet-formatted data comprises RTP (real time protocol) media, wherein the target gateway comprises an RTP handling unit and wherein said default frame generator comprises a portion of the RTP handling unit.

12. In the radio communication system of claim 1 wherein the communication system further comprises at least a third communication station, wherein the mobile station formed of the first communication station is operable in a multi-communication mode permitting concurrent communication sessions between the mobile station and the second communication station and between the mobile station and the third communication station, at least a selected one of the concurrent communication sessions in an inactive state when the effectuation of the subsequent communication through the target gateway occurs, a further improvement of apparatus for the at least one of the second and at least third communication stations, respectively, with which the communication session with the mobile station is in the inactive state, said apparatus for facilitating uninterrupted communications when the communication session between the mobile station and the at least the selected one of the second and at least third communication stations returns to an active state, said apparatus comprising:

a timer located at least at the selected one of the second and at least third communication stations in the inactive state when the effectuation of the subsequent communication occurs, said timer for timing periods of absence of incoming data during the communication session with the mobile station, said timer for generating a request to alter communication session parameters if a timed period of the absence of incoming data exceeds a selected time period.

13. The apparatus of claim 12 wherein the packet-formatted data comprises RTP (real time protocol) media, wherein the at least one selected of the second and at least third communication stations having the communication session in the inactive state further comprises an RTP handling unit and wherein said timer forms a portion of the RTP handling unit.

14. In a radio communication system operable to permit concurrent communication of packet-formatted data between a mobile station and a second communication station and between the mobile station and a third communication station, the packet-formatted data communicated by way of a communication network having a radio part and a wireline part and the communication network including a source gateway through which communications are initially effectuated and a target gateway through which communications are subsequently selected to be effectuated, at least a selected one of the concurrent communication sessions in an inactive state when the effectuation of the subsequent communication through the target gateway occurs, an improvement of apparatus for the at least the selected one of the second and at least third communication stations, respectively, having the communication session in the inactive state, said apparatus for facilitating uninterrupted communications when the communication sessions between the mobile station and the at least the selected one of the second and at least third communication stations, having the communication session in the inactive state, returns to an active status, said apparatus comprising;

a timer located at the at least the second one of the second and at least third communication stations, said timer for timing periods of absence of incoming data during the communication session with the mobile station, said timer for generating a request to alter communication session parameters if a timed period of the absence of incoming data exceeds a selected timer period.

15. In a method for communicating packet-formatted data between a first communication station and a second communication station by way of a communication network having a radio part and a wireline part, the first communication station forming a mobile station, and the communication network including a source gateway through which communications are initially effectuated and a target gateway through which communications are subsequently selected to be effectuated, an improvement of a method for the target gateway for informing the second communication station of selection of target gateway for effectuation of subsequent communications therethrough, said method comprising:

providing to the target gateway indications of selection of the target gateway through which to effectuate the subsequent communications;

generating a default frame at the target gateway responsive to the indications provided to the target gateway during said operation of providing, the default frame identifying the target gateway; and transmitting the default frame to the second communication station, thereby to inform the second communication station of the target gateway for the effectuation therethrough of the subsequent communications.

16. The method of claim 15 wherein the indications of selection provided to the target gateway during said operation of providing comprise uplink data generated by the mobile terminal.

17. The method of claim 16 comprising the additional operation of determining whether the uplink data generated by the mobile terminal and provided to the target gateway in valid data.

18. The method of claim 17 comprising the additional alternative operations of:

forwarding on the uplink data to the second communication station if the uplink data is determined to be valid data; otherwise substituting each uplink data frame of the uplink data determined to be invalid with a default data frame.

19. The method of claim 15 wherein the default frame generated during said operation of generating comprises a SID (silence indication) frame.

20. The method of claim 17 comprising the additional operations of:

timing, at the second communication station absence of incoming data from the mobile station; and generating a request to alter communication session parameters if a timed period of the absence of the incoming data exceeds a selected time period.

* * * * *